Sept. 24, 1968  W. R. MUSTIAN, JR  3,402,997
CONCENTRATING AND SEPARATING IMPURITY-CONTAINING
PHOSPHORIC ACIDS
Filed March 25, 1964
FIG. I
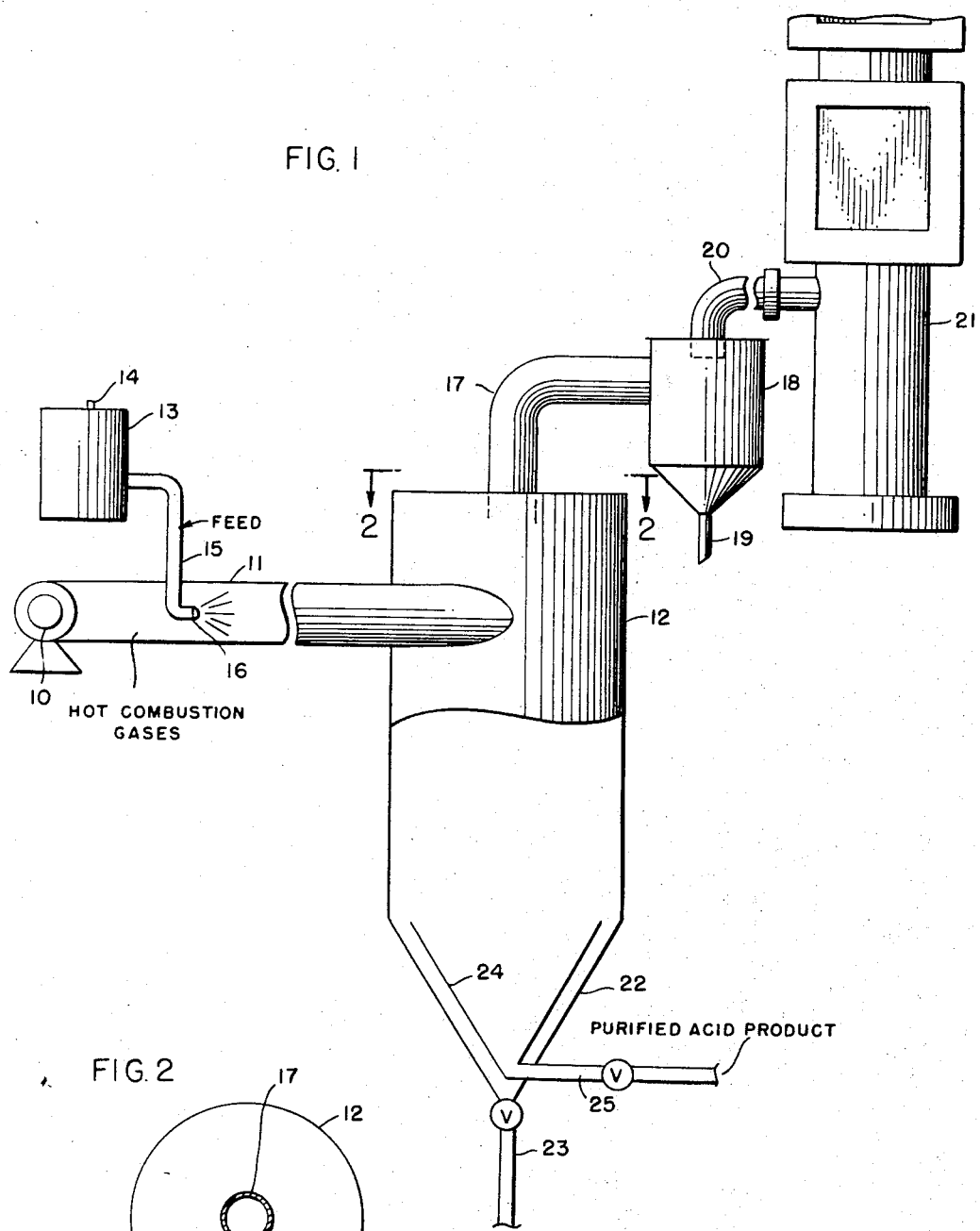
FIG. 2
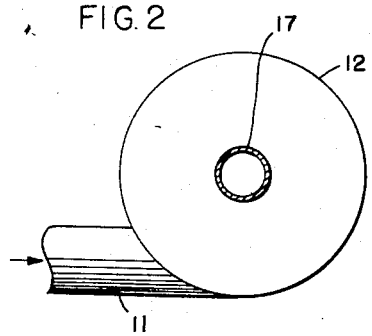
INVENTOR:
WILLIAM R. MUSTIAN, JR.
BY
*Carl C. Batz*
ATT'Y

United States Patent Office

3,402,997
Patented Sept. 24, 1968

3,402,997
CONCENTRATING AND SEPARATING IMPURITY-CONTAINING PHOSPHORIC ACIDS
William R. Mustian, Jr., Lakeland, Fla., assignor to Armour Agricultural Chemical Company, a corporation of Delaware
Filed Mar. 25, 1964, Ser. No. 354,670
5 Claims. (Cl. 23—165)

ABSTRACT OF THE DISCLOSURE

A process for concentrating wet process phosphoric feed acid containing metal impurities to form polyphosphoric acid and recovering a concentrated fraction having a reduced content of metal impurities in which the feed acid is passed in finely-divided form in a stream of combustion gases for the production of metaphosphoric acid which reacts with metal impurities to form metaphosphate metal salts, the combined stream being passed tangentially into a cylindrical zone at a velocity to form a rotating annulus, purified phosphoric acid being recovered from the central portion of the annulus and the fraction containing the greater portion of the salts being withdrawn from the periphery of the annulus.

---

This invention relates to concentrating and separating heat-sensitive, impurity-containing phosphoric acids and the like, and more particularly to the treating of wet process phosphoric acids for the separate recovery of concentrated phosphoric acids substantially free of metal salts and other impurities and a phosphoric acid fraction containing metal phosphate complexes (salts).

Wet process phosphoric acids usually contain from about 1 to 15 percent of metals as impurities, and also other impurities, and the presence of such impurities in the wet process acids has constituted the main problem in the treatment of such acids for concentrating them. If the impurities are allowed to remain in the product, the product is unsuitable for food grade phosphate use or for use in detergents and many other uses, and such product cannot compete with furance acid in such areas.

When the wet process phosphoric acid or other acid containing metal impurities, etc., is concentrated by the removal of water to a high degree, high analysis polyphosphoric acids, including metaphosphoric acid, are formed, and such acid fractions combine with the metal oxides in the phosphoric acid feed stock to form salts which settle out and form undesirable solids in the product. Hence, in the concentration of phosphoric acids, workers in this field have been warned to maintain lower temperatures at which metaphosphoric and such high analysis polyphosphoric acid fractions are not formed in order to prevent such deposition of solids.

I have discovered that it is possible to use high temperatures for the rapid concentration of the phosphoric acid feed stock, while at the same time producing a large yield of food grade phosphoric acid and acid useful in detergents, etc., and also recovering as a separate useful product a small fraction containing almost all of the impurities. I have further discovered that the concentration and fractionation operations can be accomplished in a single continuous operation, permitting a recovery of the high purity product and a separate recovery of the residue impurity-containing fraction useful for fertilizer and other uses. I have discovered further that high temperatures which are desirable for obtaining highly concentrated phosphoric acid products can be employed, and that the formation of a fraction of metaphosphoric acid and other high analysis polyphosphoric acids is actually beneficial in the removal of impurities in a continuous operation. Further, I have discovered that by introducing the phosphoric acids in a finely-divided form within a combustion gas stream, rapid concentration is acomplished, and the stream-bearing particles of phosphoric acid may be rotated to separate the fraction containing the impurities.

An object of the invention, therefore, is to provide a process and apparatus for the rapid and effective concentration and fractionation of impurity-containing phosphoric acids. A further object is to provide a method and means for concentrating wet process phosphoric acids containing impurities, while recovering separately a phosphoric acid product substantially free of the impurities and a phosphoric acid heavy fraction containing the bulk of impurities. Yet another object is to provide a method and means for rotating at high velocity a stream of combustion gases and introducing into such stream finely-divided phosphoric acid feed material and under conditions in which metaphosphoric acid and other high analysis polyphosphoric acids react with metal impurities for the forming of heavy phosphate salts which are recovered from the outer periphery of the rotating body or annulus. Other specific objects and advantages will appear as the specification proceeds.

The invention is shown, in an illustrative embodiment, by the accompanying drawing, in which—

FIGURE 1 is a diagrammatic view having portions broken away and showing in side elevation apparatus embodying my invention and in which the invention may be carried out; and FIG. 2, a broken, partly-sectional view, the section being taken as indicated at line 2—2 of FIG. 1.

In one embodiment of my invention, phosphoric acids containing metal impurities, such as, for example, wet process phosphoric acids, are heated by contact with hot products of combustion to a temperature at which are formed polyphosphoric acids, including metaphosphoric acid, which react with the metal impurities to form phosphate metal salts which are heavier than the remaining phosphoric acid fractions and are separated therefrom by centrifugal action. I prefer to introduce the feed phosphoric acid in a finely-divided form into a high velocity stream of hot combustion gas and to rotate the same within a confined zone to form a rotating annulus. The temperature of the hot combusion gases is maintained at a sufficiently high level to form the metaphosphoric acids, etc., which react with the metal impurities, and the resulting heavy fraction is thrown to the periphery of the annulus for separate recovery of this fraction. The hot gases containing the evolved water vapor is withdrawn from the top of the zone or annulus, and a purified concentrated phosphoric acid product may be withdrawn from the lower portion of the annulus inwardly of the periphery thereof.

In the illustration given in the drawing, 10 designates a blower communicating with a furnace (not shown) from which it draws hot products of combustion and forces the same at high velocity through the conduit 11. Conduit 11, as shown best in FIG. 2, discharges tangentially into the separator casing 12 so as to form a rapidly rotating stream or annulus within the cylindrical casing 12. The phosphoric acid feed within supply tank 13 may be forced by air pressure or other gaseous pressure supplied through pipe 14, through a conduit 15 to a spray nozzle 16 so that the feed is broken up and distributed in finely-divided drops within the gaseous stream in conduit 11. It will be understood that any suitable means for spraying the feed in a finely-divided condition into the gaseous stream may be employed.

An outlet condut 17 leads upwardly and centrally from the separator 12 and discharges into a cyclone separator 18. Entrained phosphoric acid may be recovered at the bottom of the vessel 18 through the pipe 19. The gases and vapor continue through pipe 20 to the floating bed scrubbers 21 of well-known construction, where condensable and water-soluble pollutants are recovered.

The vessel 12 is provided with a V-shaped bottom portion 22 communicating with the valve-controlled outlet 23 for the recovery of the heavy phosphate and impurity-containing product. Within the vessel 12 is a V-shaped receptacle 24 communicating at its bottom with a valve outlet pipe 25 for the recovery of the liquid purified acid product. With this arrangement, the outlet 23 communicates with the periphery of the rotating annulus so as to draw off from the periphery the heavy residue or phosphate fraction containing the metal impurities, while the central vessel 24 communicates with the inner portion of the rotating body or annulus so as to draw off the lighter phosphoric acid fraction which contains very little of the impurities. If a portion of the phosphoric acid product is entrained with the gas and vapors passing upwardly through pipe 17, such phosphoric acid, since it is withdrawn from a central portion of the vessel 12, is found to be substantially free of impurities, and this pure product may be recovered through pipe 19.

In the operation of the process and apparatus, hot combustion gases are forced through pipe 11 at a velocity sufficient for forming a rotating annulus within vessel 12 so as to bring about a separation of the heavier and lighter fractions. The velocity is not critical since some separation can be obtained at low velocities and better separation obtained at high velocities, and it is optional with the operator to select any suitable velocity which forms the annulus with a sufficient speed of rotation for effecting a separation.

The temperature of the hot combustion gases is maintained at a sufficiently high level to bring about the production of polyphosphoric acids, including metaphosphoric acid, which will react with the metal impurities to form phosphate salts. Such temperatures may vary from about 1200° F. to 3000° F. Since the furnace combustion gases are usually higher, such bases may be diluted with air to bring the temperature to one suitable for concentrating the product and producing at least a polyphosphoric acid fraction which will react with the metal impurities. I prefer to employ gas temperatures of 1700° to 2500° F. The gas temperatures are high enough to raise the temperature of the phosphoric liquid drops or droplets to about 650° to 1000° F. and preferably to about 680° to 710° F., which temperatures are effective in producing metaphosphoric groups and possibly other poly acid groups which form polymers with the impurities, such as aluminum and iron.

The feed stock may be any wet process phosphoric acid feed or phosphoric acid containing metal impurities, and the acid may be discharged in a stream or sprayed in a finely-divided condition into the gas stream for the rapid evaporation of moisture and for the heating of the phosphoric acid feed. I prefer to discharge the feed in the form of a mist or fine spray to increase the rapid heating of the phosphoric acid droplets, but it will be understood that the process may be employed in the treating of a stream of phosphoric acid which is then broken into drops by the rapidly moving hot gases.

The moisture-laden gases which disengage from the acid in the space below the central outlet pipe 17 are removed to the cyclone evaporator 18, and the condensation therein and in scrubber 21 brings about a degree of vacuum which aids in such removal. If desired, a blower may be utilized in communication with pipe 17 for increasing the suction therein, and the operation may be readily controlled for the removal of substantial amounts of purified phosphoric acid from the central portion of the rotating annulus in vessel 12, and such purified product may be recovered, as already described, through pipe 19.

The metaphosphoric acid and other polyphosphoric acids which react with the metal impurities to form phosphate salts are carried to the outer periphery of the rotating annulus in vessel 12 and are withdrawn as a separate product through pipe 23 for use as fertilizer and for other uses. The purified acid product containing little or substantially no metal impurities is recovered through pipe 25, and such a product has a value as a food phosphoric acid product and for use in detergents and other uses.

By the above procedure, I find that about 92 to 95 percent and higher of the phosphoric acid can be recovered either through outlet 19 or pipe 25 as a purified product substantially free of metal impurities, while about 5 to 8 percent of the phosphoric acid is recovered in the form of a heavy acid and metal phosphate residue withdrawn through pipe 23.

By way of a specific example, starting with a wet process acid of 54.7 percent $P_2O_5$ containing 1.19 percent $Al_2O_3$ and 1.23 percent $Fe_2O_3$, one can produce in the apparatus shown an acid product of at least 80 percent $P_2O_5$, with solids of about 0.1 percent, citrate insoluble about 0.05 percent, $Fe_2O_3$ about 0.3 percent and $Al_2O_3$ about 0.3 percent. A more highly purified product can be obtained by carefully controlling the withdrawal of the fraction containing the metal phosphates.

While in the foregoing description I have referred to a specific form of apparatus to bring about the concentration and fractionation operations, it will be understood that various forms of apparatus may be employed for this purpose in contacting phosphoric acid feed with hot combustion gases for the forming of metaphosphoric acid, etc., and the reaction thereof with impurities and the removal by centrifugal action, etc., of the heavier fraction.

Specific detailed examples, illustrative of the process, may be set out as follows:

Example I

In apparatus as shown in the drawings, hot combustion gases are drawn from a furnace and diluted with air to a temperature of 2000° F. and pass through the conduit 11 and tangentially into the vessel 12 to produce a rotating annulus therein. Wet process phosphoric acid having a phosphoric acid content of 54.7 weight percent calculated as $P_2O_5$ equivalent is sprayed under air pressure into the conduit 11 and is carried by a gas stream into the rotating annulus in vessel 12. The feed rate of the sprayed acid is 1.6 gallons per minute. The feed contains as impurities 0.54 percent of insolubles. The percent of $Al_2O_3$ is 1.19, and on a $P_2O_5$ basis the percent of $Al_2O_3$ is 2.2. The percent of $Fe_2O_3$ is 1.23, and the percent on a $P_2O_5$ basis is 2.2. The temperature of the entrained liquid droplets is about 640° F. The moisture-laden gases which are withdrawn from the top of the separator 12 have a temperature of about 765° F. A product is obtained from the cyclone separator 18, and a liquid product is also obtained through the withdrawal pipe 25. An unpurified product or product containing the impurities is recovered through conduit 23. The latter product recovered through conduit 23 has a phosphorus content of 81.1, and a water-insoluble percent of 5.94. The percent of $Al_2O_3$ is 1.75, and on a $P_2O_5$ basis is 2.2. The percent of $Fe_2O_3$ is 1.63, and on a $P_2O_5$ basis 2.0. The purified product recovered through pipe 25 has a phosphorus content of 81.7 on a $P_2O_5$ basis, and a water-insoluble content of 0.05. The $Al_2O_3$ is 0.34, and on a $P_2O_5$ basis 0.44. The percent of $Fe_2O_3$ is 0.33, and on a $P_2O_5$ basis 0.4.

Example II

The process is as described in Example I using the same feed and the same operating conditions, except that the combustion gases have a temperature of 2200° F. and the liquid drops are heated to about 700° F. The product containing the impurities has a phosphorus content of 81.0 calculated on a $P_2O_5$ basis, the percent of $H_2O$ insolubles being 7.53, the percent of $Al_2O_3$ being 1.64, and on a $P_2O_5$ basis 2.0 The percent of $Fe_2O_3$ is 1.64, and on a $P_2O_5$ basis 2.0. The purified product from pipe 25 is 80.0 phosphorus on a $P_2O_5$ basis, the percent of water-insoluble being 0.08, and the percent of $Al_2O_3$ being 0.21 (on a $P_2O_5$ basis 0.26). The percent of $Fe_2O_3$ is 0.28 (0.33 on a $P_2O_5$ basis).

The purified product from pipe 19 is substantially the same in composition as that recovered through pipe 25.

While in the foregoing specification I have set forth, specific structure and specific process steps in considerable detail for the purpose of illustrating embodiments of my invention, it will be understood that such detail or details may be varied widely by those skilled in the art without departing from the spirit of my invention.

I claim:

1. In a process for concentrating and purifying wet process orthophosphoric feed acid containing about 1–15 percent of metal impurities, including iron and aluminum, to form polyphosphoric acids and for recovering a concentrated fraction thereof having a reduced content of metal impurities, the steps of passing said wet process orthophosphoric acid feed in the form of droplets, and containing about 1–15 percent of metal impurities into a stream of hot combustion gases to bring the temperature of said droplets to about 650–1000° F. for the production of polyphosphoric acid including metaphosphoric acid which reacts with said metal impurities to form metaphosphate metal salts which are heavier than said polyphosphoric acid, passing said combined stream containing said acid and salts tangentially into a confined cylindrical zone and at a velocity to form a rotating annulus in said zone, withdrawing gases from an upper portion of said annulus, withdrawing purified polyphosphoric acid having a reduced content of said impurities from a central portion of said rotating annulus, and withdrawing polyphosphoric acid containing the greater portion of said phosphate metal salts from the periphery of said annulus.

2. The process of claim 1 in which the temperature of the droplets is in the range of about 680–710° F.

3. The process of claim 1 in which said combustion gas has a temperature of about 1200–3000° F.

4. The process of claim 1 in which said combustion gas has a temperature of about 1700–2500° F.

5. The process of claim 1 in which said feed acid is broken up into a finely-divided mist form and discharged in said finely-divided condition into said stream of combustion gases.

References Cited

UNITED STATES PATENTS

| | | | |
|---|---|---|---|
| 2,977,196 | 3/1961 | Fleming | 23—165 |
| 2,338,408 | 1/1944 | Coleman et al. | 23—165 |
| 3,023,083 | 2/1962 | Rodis et al. | 23—107 |
| 3,053,615 | 9/1962 | Steinert | 159—48 X |
| 3,057,711 | 10/1962 | Reusser et al. | 71—43 |
| 3,083,077 | 3/1963 | Bjorkman et al. | |
| 3,104,947 | 9/1963 | Switzer et al. | 23—165 |
| 3,192,013 | 6/1965 | Young | 23—165 |
| 3,316,061 | 4/1967 | Csendes et al. | 23—165 |

OTHER REFERENCES

Kirk-Othmer, Encyclopedia of Chemical Technology, second edit., vol. 10, pages 340 and 341.

EARL C. THOMAS, *Primary Examiner.*

A. J. GREIF, *Assistant Examiner.*